(12) United States Patent
Daniel et al.

(10) Patent No.: US 9,509,585 B1
(45) Date of Patent: Nov. 29, 2016

(54) APPARATUS AND METHOD FOR TIME STAMPING PACKETS ACROSS SEVERAL NODES IN A NETWORK

(71) Applicant: Xpliant, Inc., San Jose, CA (US)

(72) Inventors: Tsahi Daniel, Palo Alto, CA (US); Enric Musoll, San Jose, CA (US); Sridevi Polasanapalli, San Jose, CA (US)

(73) Assignee: Xpliant, Inc., San Jose, CA (US)

( * ) Notice: Subject to any disclaimer, the term of this patent is extended or adjusted under 35 U.S.C. 154(b) by 196 days.

(21) Appl. No.: 14/142,623

(22) Filed: Dec. 27, 2013

Related U.S. Application Data

(60) Provisional application No. 61/873,287, filed on Sep. 3, 2013.

(51) Int. Cl.
*H04L 12/26* (2006.01)

(52) U.S. Cl.
CPC .................................. *H04L 43/106* (2013.01)

(58) Field of Classification Search
CPC ... H04L 43/106; H04L 65/605; H04L 65/80; H04L 65/608
USPC ............... 370/229, 231, 235, 252, 475, 241, 370/243–245, 248, 253
See application file for complete search history.

(56) References Cited

U.S. PATENT DOCUMENTS

| | | | |
|---|---|---|---|
| 5,793,976 A * | 8/1998 | Chen ................... | H04L 12/2697 370/252 |
| 2008/0075031 A1* | 3/2008 | Ohayon ............. | H04N 21/2187 370/316 |
| 2011/0222412 A1* | 9/2011 | Kompella ............... | H04L 45/00 370/241.1 |
| 2013/0083808 A1* | 4/2013 | Sridhar ................. | H04L 65/605 370/475 |

* cited by examiner

*Primary Examiner* — Mang Yeung
(74) *Attorney, Agent, or Firm* — Cooley LLP

(57) ABSTRACT

A method includes receiving a packet at an ingress node of a network. A hierarchical time stamp is created in the packet by the ingress node. The hierarchical time stamp includes an initial time stamp and an initial node identifier. The packet is passed to another network node, which adds a subsequent time stamp and a subsequent node identifier to the hierarchical time stamp. The packet is received at an egress node of the network. A final time stamp and a final node identifier are added to the hierarchical time stamp at the egress node. The hierarchical time stamp is then removed from the packet and the packet is passed to another network. The hierarchical time stamp is delivered to an analyzer.

12 Claims, 4 Drawing Sheets

APPARATUS AND METHOD FOR TIME STAMPING PACKETS ACROSS SEVERAL NODES IN A NETWORK

CROSS-REFERENCE TO RELATED APPLICATION

This application claims priority to U.S. Provisional Patent Application Ser. No. 61/873,287, filed Sep. 3, 2013, the contents of which are incorporated herein by reference.

FIELD OF THE INVENTION

This invention relates generally to computer network communications. More particularly, this invention relates to evaluating timing information in computer network communications.

BACKGROUND OF THE INVENTION

Standard protocols exist in IP networks so that two or more nodes in the network are able to synchronize and/or syntonize their individual clocks. The two most widely used protocols are IEEE 1588 and NTS. Synchronization operations are typically performed on a link-by-link basis.

It would be desirable to provide a low cost mechanism to obtain comprehensive timing information across a network.

SUMMARY

A method includes receiving a packet at an ingress node of a network. A hierarchical time stamp is created in the packet by the ingress node. The hierarchical time stamp includes an initial time stamp and an initial node identifier. The packet is passed to another network node, which adds a subsequent time stamp and a subsequent node identifier to the hierarchical time stamp. The packet is received at an egress node of the network. A final time stamp and a final node identifier are added to the hierarchical time stamp at the egress node. The hierarchical time stamp is then removed from the packet and the packet is passed to another network. The hierarchical time stamp is delivered to an analyzer.

A network includes nodes to maintain end-to-end timing information between an input node and an output node of the network. Each node in the network affixes a node identifier and a time stamp to a hierarchical time stamp. The output node removes the hierarchical time stamp prior to passing the packet to another network.

A network node has a packet analyzer to process a static per port control bit and a dynamic per packet control bit to alternately create a hierarchical time stamp in a packet, remove the hierarchical time stamp from a packet and insert a time stamp in an existing hierarchical time stamp.

DETAILED DESCRIPTION

Figure 1:
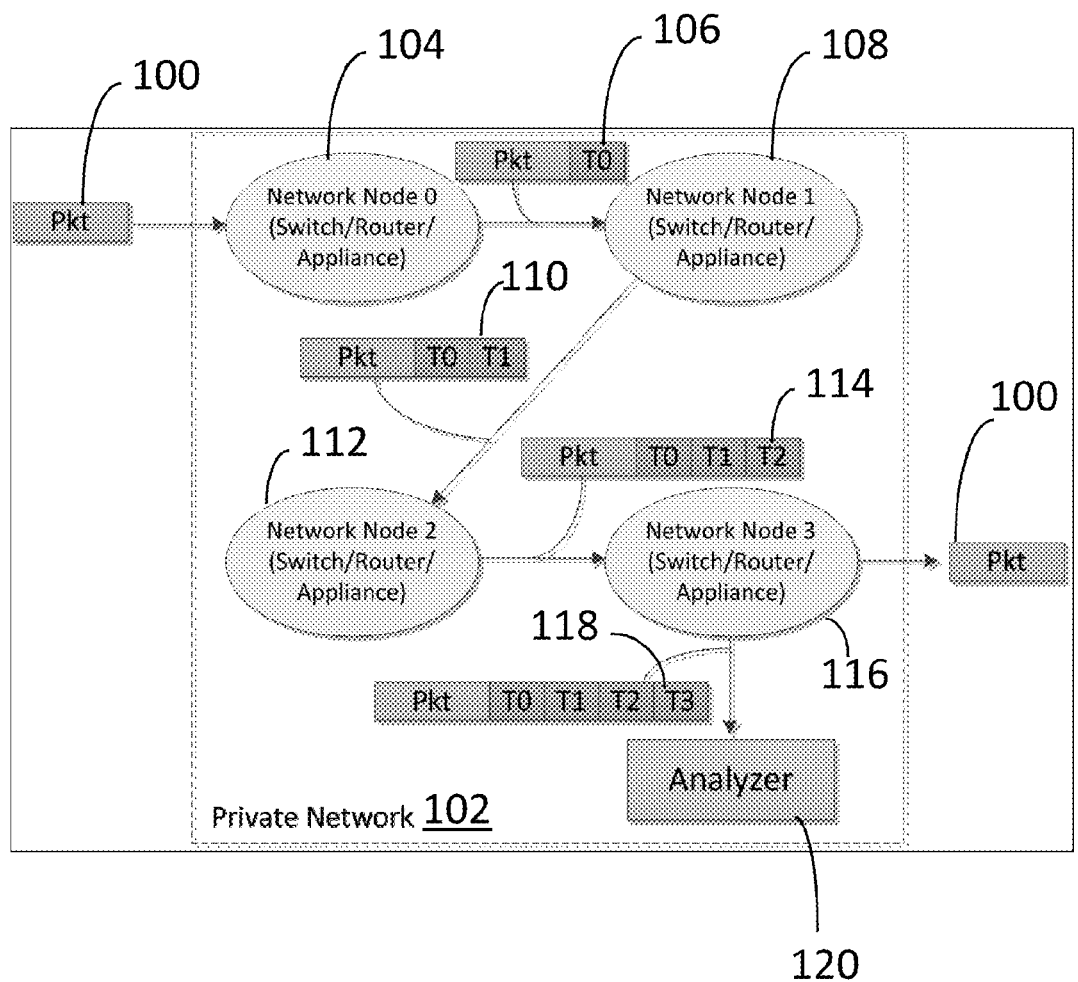
FIG. 1 shows packet time stamps accumulating as a packet flows through a network configured in accordance with an embodiment of the invention.

FIG. 1 shows an example of a packet 100 entering a network 102 and leaving the network 102 in the same form. Inside the network 102 timing information is attached to the packet at each node. In particular, a first node 104, which may be a switch, router or appliance, adds a first time stamp 106. A second node 108 adds a second time stamp 110, while a third node 112 adds a third time stamp 114. An exit node 116 adds a fourth time stamp 118. The exit node 116 then strips the time stamps 106, 110, 114 and 118 to render the original packet 100, while passing the packet 100 and time stamps 106, 110, 114 and 118 to analyzer 120.

As long as all the nodes in the network can handle the reception of the timestamp information attached to the packet and insertion of the additional timestamp information into the packet, this timing information does not need to follow any of the standard IP protocols. But the non-standard information is stripped before the packet is sent out to a network built with standard equipment. That is, network 102 observes a common non-standard protocol to process the HTS. The information associated with this non-standard protocol is stripped from the packet before routing the packet outside the network 102.

The timing information may have any number of formats. Characteristics associated with formats may include: type of timing information, length of time stamps, aggregate timing information and maximum amount of timing information. For example, each node could insert the time when the packet arrives (ingress TS) at the node and also the time when the packet leaves the node (egress TS), so that the latency through the links that connect the nodes can be determined. Alternatively, the node could insert just the ingress TS or the egress TS. Moreover, the TS themselves could be of different size depending on the accuracy that is needed.

For simplicity, the timing information across all nodes may reside in a fixed size all the time, regardless of how many time stamps have been inserted at any given time. There may be a maximum size for the overall timing information, thereby limiting the number of nodes that can insert timing information.

Figure 2:
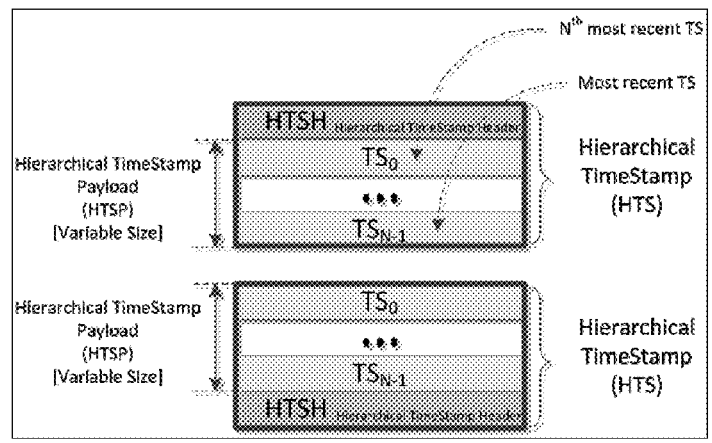
FIG. 2 shows a Hierarchical Time Stamp (HTS) format utilized in accordance with an embodiment of the invention.

FIG. 2 shows two high-level format examples. The format is called Hierarchical Time Stamp or HTS because it contains the information of several nodes as the packet traverses the network. The formats shown in the figure assume a variable HTS payload (HTSP); therefore some control information is needed to determine how many timestamps the HTSP contains at any given time (N in the Figure). This information is part of the HTS Header (HTSH). The HTSH can be positioned anywhere in the HTS, but usually is placed at the beginning or at the end (the two cases shown in the Figure). The HTSH can contain other information, such as the size of each TS, whether there has been an error in the insertion of the TS by a particular node, etc.

FIG. 2 also shows how the timestamps are arranged inside the HTS payload. In this case, the last N timestamps are kept in the HTS payload, as opposed to, for example, keeping the first N timestamps seen in the network.

Figure 3:
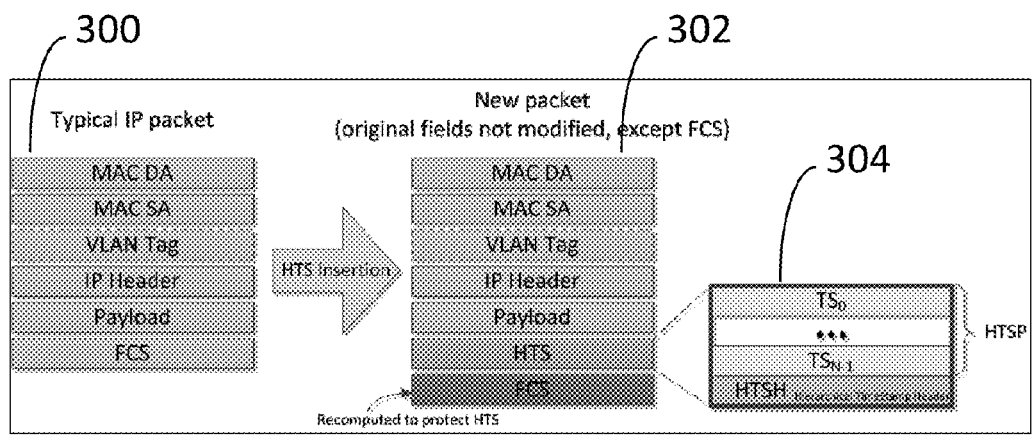
FIG. 3 shows insertion of an HTS in a typical IP packet processed in accordance with an embodiment of the invention.

Within an IP packet, the most common place to insert the HTS is at the end of the packet (but before the Frame Check Sequence or FCS) so that the transmission of the start-of-packet is not delayed when the HTS is removed from the packet. FIG. 3 shows this case. In particular, FIG. 3 shows a typical IP packet 300, which is modified to create a new packet 302. The new packet 302 has an HTS 304 positioned before the FCS. It is important to note that the insertion of the HTS does not modify any of the original fields of the packet except for the FCS that needs to be recomputed (if the HTS has been modified) to protect the data in the HTS.

Figure 4:
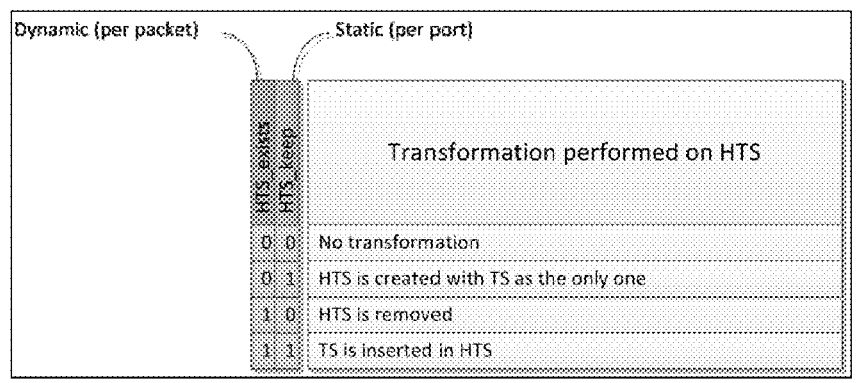
FIG. 4 shows HTS operations performed in accordance with an embodiment of the invention.

Each node needs to support 3 basic operations related to the HTS: (1) create the initial HTS, (2) remove the HTS and (3) insert a TS into the existing HTS. FIG. 4 shows these operations. The node decides which operation (or none) to perform based on two bits: an HTS_exists bit provides a per-packet notification of whether the HTS exists or not, while the HTS_keep bit provides a per-egress-port configuration that indicates whether the HTS needs to be removed or not before the packet is transmitted.

Figure 5:
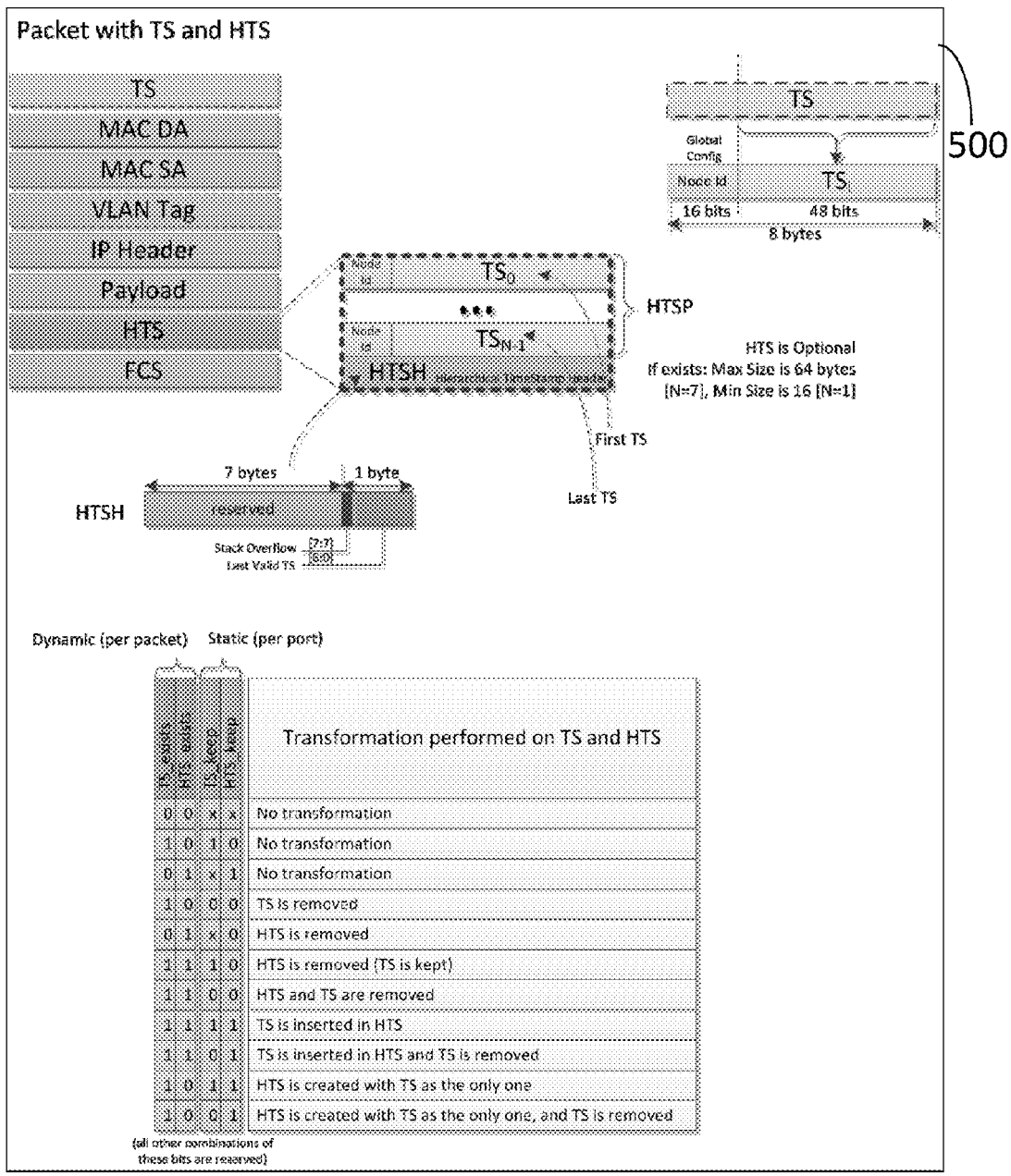
FIG. 5 shows HTS operations performed in accordance with an embodiment of the invention.

FIG. 5 illustrates an embodiment of the invention. In this embodiment, the HTS is at the end of the packet, but before the FCS. The packet may have an ingress 64-bit time stamp. If it exists, this timestamp is present at the beginning of the packet. If the packet requires the TS be inserted in the HTS, the 48 LSB bits of the TS are concatenated with a 16-bit Node Id as shown at label 500. The resulting 64 bits are inserted in the HTS. In this case, the timing information inserted by the nodes is a fixed size (64 bits).

Alternately, the HTS may be a variable size. That is, the size increases as the packet traverses nodes. The first time the HTS is generated, it will contain a single TS along with the HTSH (for a total of 16 bytes). In one embodiment, the maximum HTS size allowed is 64 bytes, so at most 7 TS can exist in the HTSP. The number of TS in the HTSP is indicated in a field in the HTSH (LastValidTS); a LastValidTS of N indicates that there are N TS in the list. A LastValidTS value of 0 indicates that there is only a single TS in the HTSP.

In one embodiment, the HTS always keeps the oldest time stamps. If there is not space for additional time stamps, a bit n the HTSH is set to indicate a stack overflow. The analyzer processes this information.

FIG. 5 illustrates an embodiment of the invention with additional control bits. The TS_exists per packet bit indicates whether the TS is present and can be used. The TS_keep per egress-port bit indicates whether the TS, if present, needs to be stripped out before transmitting the packet.

Once the different nodes in a network are synchronized or syntonized, it is possible to tag each packet arriving at a node with the timestamp using that node's internal clock. If this tagging is performed across all the nodes of the network, the latency of the packet across the network can be analyzed in detail by the analyzer 120.

Thus, the invention provides an end-to-end chain of time stamps across a network where each node in the network is configured to process the disclosed HTS. This stands in contrast to known link-by-link time stamp processing techniques that do not provide complete timing information from an ingress port, across intervening ports and then to an egress port. The comprehensive timing information allows the analyzer 120 to perform any number of timing analyses and to enforce quality of service standards at a hardware processing level.

Those skilled in the art understand that prior art time stamp techniques are costly at both the hardware and software levels. The invention provides a simple protocol observed by a set of nodes. The simple protocol operates on top of existing synchronization techniques to provide a low cost mechanism for comprehensive timing information across a network of devices observing the protocol.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A network, comprising:
a plurality of nodes to maintain end-to-end timing information between an input node and an output node of the network, wherein each node in the network affixes a node identifier and a time stamp to a hierarchical time stamp to produce a non-standard protocol packet that does not follow an Internet Protocol standard and the output node removes the hierarchical time stamp to produce a standard protocol packet prior to passing the packet to another network that does follow the Internet Protocol standard, wherein the standard protocol packet follows the Internet Protocol standard.

2. The network of claim 1 wherein the output node passes the hierarchical time stamp to an analyzer that evaluates timing parameters associated with the hierarchical time stamp.

3. The network of claim 2 wherein the analyzer verifies a quality service parameter within the network.

4. The network of claim 1 wherein the input node creates the hierarchical time stamp.

5. The network of claim 1 wherein the hierarchical time stamp includes a header.

6. The network of claim 5 wherein the header specifies the number of time stamps in the hierarchical time stamp.

7. The network of claim 5 wherein the header specifies the size of each time stamp.

8. The network of claim 5 wherein the header specifies time stamp error information.

9. The network of claim 1 wherein the hierarchical time stamp is positioned in the payload of the packet.

10. A method, comprising:
- receiving a packet at an ingress node of a network, wherein the packet observes an Internet Protocol standard;
- creating, at the ingress node, a hierarchical time stamp in the packet, wherein the hierarchical time stamp includes an initial time stamp and an initial node identifier, wherein the hierarchical time stamp produces a non-standard protocol packet that does not follow the Internet Protocol standard;
- passing the packet to another network node, which adds a subsequent time stamp and a subsequent node identifier to the hierarchical time stamp;
- receiving the packet at an egress node of the network;
- adding, at the egress node, a final time stamp and a final node identifier to the hierarchical time stamp;
- removing, at the egress node, the hierarchical time stamp from the packet such that the packet observes the Internet Protocol standard;
- passing the packet to another network that follows the Internet Protocol standard; and
- delivering the hierarchical time stamp to an analyzer.

11. The method of claim 10 wherein creating includes creating a hierarchical time stamp with a header.

12. The method of claim 10 wherein creating includes creating a hierarchical time stamp in the payload of the packet.

\* \* \* \* \*

UNITED STATES PATENT AND TRADEMARK OFFICE
CERTIFICATE OF CORRECTION

| | | |
|---|---|---|
| PATENT NO. | : 9,509,585 B1 | Page 1 of 1 |
| APPLICATION NO. | : 14/142623 | |
| DATED | : November 29, 2016 | |
| INVENTOR(S) | : Tsahi Daniel et al. | |

It is certified that error appears in the above-identified patent and that said Letters Patent is hereby corrected as shown below:

On the Title Page

Item (56), under "U.S. PATENT DOCUMENTS", Column 2, Line 1, delete "Chen" and insert -- Chen et al. --, Item (56), under "U.S. PATENT DOCUMENTS", Column 2, Line 3, delete "Ohayon" and insert -- Ohayon et al --.

In the Specification

In Column 3, Line 21, delete "48 LSB bits" and insert -- 48 bits --,

In Column 3, Line 36, delete "not space" and insert -- no space --,

In Column 3, Line 37, delete "n" and insert -- in --,

In Column 4, Line 24, delete "purposes" and insert -- purpose --.

In the Claims

In Column 4, Line 59, in Claim 3, delete "quality" and insert -- quality of --.

Signed and Sealed this
Thirteenth Day of March, 2018

Andrei Iancu
*Director of the United States Patent and Trademark Office*